Jan. 23, 1968     C. LE ROY CARPENTER ET AL     3,365,274

METAL AND METALLOID OXIDE PRODUCTION

Filed July 13, 1964

INVENTOR.
L. C. CARPENTER, C. B. WENDELL
BY

3,365,274
METAL AND METALLOID OXIDE PRODUCTION

Clifford Le Roy Carpenter, Wellesley, and Charles B. Wendell, Jr., Canton, Mass., assignors to Cabot Corporation, Boston, Mass., a corporation of Delaware
Filed July 13, 1964, Ser. No. 382,250
17 Claims. (Cl. 23—292)

The present invention relates to the manufacture of pyrogenic pigments and more specifically to an improved process and apparatus for the production of pyrogenic titanium dioxide.

Pyrogenic pigments in general and particularly pyrogenic titanium dioxide are currently produced by various vapor phase processes including the oxidation and/or hydrolysis of metal halide vapors at elevated temperatures. The following equations are believed to correctly illustrate typical metal oxide producing reactions wherein titanium dioxide is produced by oxidation in Equations 1 and 2, and hydrolysis in Equations 3 and 4:

(1) $TiCl_4 + O_2 \rightarrow TiO_2 + 2Cl_2$
(2) $2TiOCl_2 + O_2 \rightarrow 2TiO_2 + 2Cl_2$
(3) $TiCl_4 + O_2 + 2H_2 \rightarrow TiO_2 + 4HCl$
(4) $2TiOCl_2 + 2H_2 + O_2 \rightarrow 2TiO_2 + 4HCl$ Generally speaking, the reactions illustrated above are not exothermic to the extent desired in commercial operations; accordingly, heat is normally supplied to said reactions by any suitable means although the burning of a fuel gas (such as carbon monoxide) in the reaction zone is often preferred.

Processes of the above-mentioned type, disclosed in detail for example, in U.S. Patents 2,488,439; 2,488,440 and 2,980,509, are found to be extremely advantageous in that said processes (a) are not normally subject to as severe a problem of aggregation of the finely-divided pigment product as are pigments produced by wet or liquid phase processes, such as by precipitation from solution, and (b) simplify the product recovery by eliminating the need for drying or otherwise removing liquid associated with the product.

However, several difficulties are often encountered in pyrogenic metal oxide producing processes of the above-described type including (a) excessive residence time of the product within the reaction zone and (b) the deposit of sizeable quantities of product on the walls of the reaction chamber and/or on burner parts which product can cause plugging of apparatus and/or can crystallize or "whisker" and eventually adulterate the final product by periodically dropping off into the main product stream. While the causes of these difficulties are not entirely understood, it has been discovered that the severity of said difficulties is frequently related to the degree of turbulent flow within and about the reaction zone. Thus, in pyrogenic metal oxide producing apparatus typically in use heretofore, the turbulent flow of process gases often creates eddys and/or recirculative flow patterns which encourage said excessive residence time and/or deposit build-up.

In accordance with the present invention, however, contact between the product formed and the burner or reaction chamber walls and recirculation of product into the reaction zone are greatly reduced.

Accordingly, it is a principal object of the present invention to provide an improved process and apparatus for the production of metal oxides.

It is another object of the present invention to provide improved apparatus for the production of pyrogenic titanium dioxide.

It is another object of the present invention to provide an improved process for the production of pyrogenic titanium dioxide.

Other objects and advantages of the present invention will in part be obvious and will in part appear hereinafter.

In accordance with the present invention, it was discovered that the above-mentioned difficulties can be ameliorated or entirely eliminated by providing for substantially laminar flow (i.e. having Reynolds' numbers of less than about 2000) of the process gases within the reaction chamber and particularly about the reaction zone. While accomplishment of laminar flow within a commercial sized reaction chamber is normally extremely difficult to attain due to (a) the sensitivity in general of presently available burners to relatively minor changes in gas flow rates, and (b) changes in dimensional ratios arising from scale-up of pilot plant or laboratory scale burners, it has been additionally discovered in accordance with the present invention that laminar flow of process gases within a reaction chamber can generally be readily achieved when said process gases are flowed through burner apparatus of appropriate dimensions as explained in detail hereinafter comprising at least three annuli preferably having rectangular cross-sections. It should be noted and clearly understood that for the purposes of the present specification and the claims appended hereto, the term "rectangular" also encompasses geometric configurations which are square.

Process gases for the purposes of the present specification comprise (a) a metal compound in vapor form,
(b) a fuel gas, and
(c) a free-oxygen containing gas.

Any metal compound that is volatilizable at temperatures below about 1000° F. is generally suitable for the purposes of the present invention. Definitely preferred, however, are metal halides and oxyhalides such as titanium tetrachloride, zirconium tetraiodide, aluminum trichloride, silicon tetrachloride, titanium oxychloride, aluminum trichloride, and the like, and mixtures thereof.

Fuel gases, i.e. gases utilized in preheating and/or supplying heat to the reaction zone by combustion with a free-oxygen containing gas and which are suitable for the purposes of the present invention are generally well known. Specific examples of fuel gases that can be utilized are methane, propane, butane, carbon monoxide, sulfur chlorides, sulfur vapor and the like. Carbon monoxide, however, has generally been found to be highly preferred, especially in the production of titanium dioxide by oxidation reactions, because carbon monoxide is relatively readily available and because it is generally desirable that fuel gases containing hydrogen be avoided or utilized only in limited quantities.

Free-oxygen containing gases (i.e. gases containing uncombined oxygen) suitable for the purposes of the present invention are generally obvious. Preferred for use in the process of the present invention, however, are dry oxygen and/or dry air. It is pointed out that in order to efficiently accomplish simultaneously both the metal oxide producing reactions and the substantially complete combustion of the fuel gas, it is normally necessary to introduce into the burner a total of at least about sufficient free-oxygen containing gas to react stoichiometrically with the metal compound and the fuel gas introduced thereinto. Preferably, an excess of free-oxygen containing gas is introduced.

A better understanding of the present invention can be had when reference is made to the drawing forming part hereof wherein.

Figure 1:
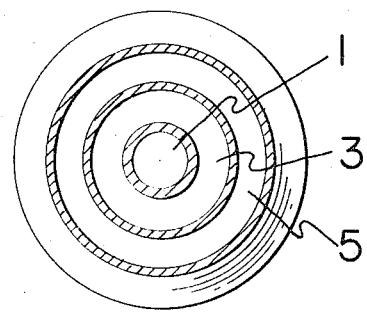
FIGURE 1 is a diagrammatic schematic, cross-sectional illustration of an embodiment of the present invention comprising burner apparatus having three annuli.
Figure 2:
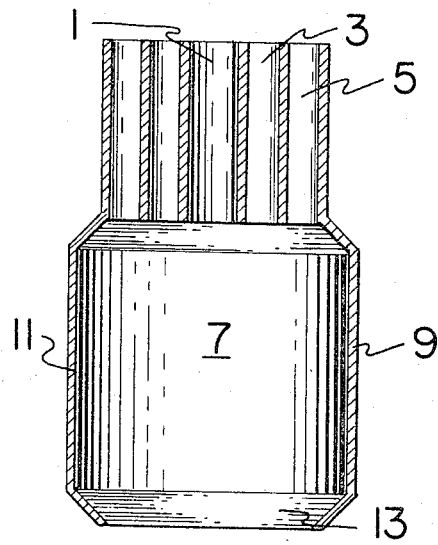
FIGURE 2 is a schematic diagrammatic illustration of the burner of FIGURE 1 in operational combination with a reaction chamber (not drawn to scale)

In a typical titanium dioxide producing operation, referring now to FIGURES 1 and 2, reaction zone 7 is preheated in any suitable manner. When zone 7 has attained the desired temperature, normally about 2000–2500° F., there is introduced into annulus 1 vapors of a metal halide compound. In the meantime, a fuel gas is introduced through annulus 3 and at least sufficient free-oxygen containing gas through annulus 5 to react stoichiometrically with both said fuel gas and said metal halide vapors. Free oxygen in the free-oxygen containing gas introduced through annulus 5 diffuses inwardly toward the metal halide vapors introduced through annulus 1 at a substantially greater rate than the latter diffuses outwardly. Accordingly, the metal halide vapors and free-oxygen react within reaction zone 7 to produce titanium dioxide, while the fuel gas and free-oxygen react within and about reaction zone 7 thereby providing heat to the reaction progressing in zone 7 while relatively effectively shielding walls 11 from the product produced in said zone.

Generally speaking, it is necessary, in order to prevent deposition of product on the reaction chamber walls, that the metal halide vapor to be introduced through the central annulus and that the fuel gas and the free-oxygen containing gas be introduced through the outer annuli. This arrangement, coupled with the laminar flow of the process gases provides a blanket of reacting gases about reaction zone 7 thereby effectively shielding walls 11 from hot solid combustion products produced in zone 7. By the time the laminar flow pattern begins to break down, the product has cooled substantially and, in any case, is directed out of reaction chamber 9 through outlet 13.

In addition, it should be further noted that it is generally necessary, in order to prevent premature reaction within the burner, to maintain the metal halide stream separate from the free-oxygen containing stream during passage thereof through the burner. Moreover, in order to prevent "whisker" formation on the burner, the free-oxygen containing stream should not be introduced through an annulus which is immediately adjacent the metal halide bearing annulus. Accordingly, in the most preferred arrangement, the fuel gas stream or a stream of an inert gas (as will be explained in detail hereinafter) is interposed between the metal halide stream and the free-oxygen containing stream.

For the purposes of the present invention an "inert gas" is any gas which is inert to the reactants and reaction products utilized. In addition to those gases which are well known to be normally chemically inert such as nitrogen, argon, helium, neon, etc., recycled combustion products are also suitable.

Obviously, the design and specifications of the apparatus of the present invention are subject to considerable variation. Normally, however, the length of reaction chamber 9 should be sufficient to allow substantially complete reaction between the metal halide and the free-oxygen containing gas. The design and operational specifics of the burner such as the width and length of the annuli and gas flow rates required to produce laminar flow are to a large extent dependent upon the particular metal oxide producing reaction to be employed. In general, said specifics can be readily determined when the above factors are considered and applied to the following general formula for determination of Reynolds' number for flowing gases:

$$R_e = DG/\mu$$

where $R_e$ represents said Reynolds' number; D is the hydraulic diameter (which equals the cross-sectional area of the annulus divided by the wetted perimeter thereof); G is the mass flow rate of the gas (mass per unit of time per unit of area); and $\mu$ is the viscosity of the gas (mass per unit of time per unit of length). It should be borne in mind that, for any rectangular annulus having a given wetted perimeter, the longer and narrower said annulus, the smaller will be the cross-sectional area and therefore the value of D. Thus, low values, i.e. less than 2000 and preferably less than 1800 for $R_e$ in the above formula can be readily achieved.

It has been found, moreover, that the advantages accruable from the practice of the process of the present invention, are generally greater when the linear velocity of each of the streams charged into the reaction chamber does not differ by more than about 15% from the linear velocity of the streams(s) immediately adjacent. This results in "plug flow" conditions which, it has been discovered, generally give optimum results.

It is pointed out that generally the reaction zone should be maintained relatively obstructionless in order not to disturb the laminar flow pattern and in order to allow the hot metal oxide product to exit from the reaction zone with as little obstruction as possible, as said product while hot, tends to deposit and crystallize upon obstructions. It is also pointed out that in order to produce good product the residence time of the product within the reaction zone as determined by flow rates, reactions chamber size, etc., should be considered.

Figure 3:
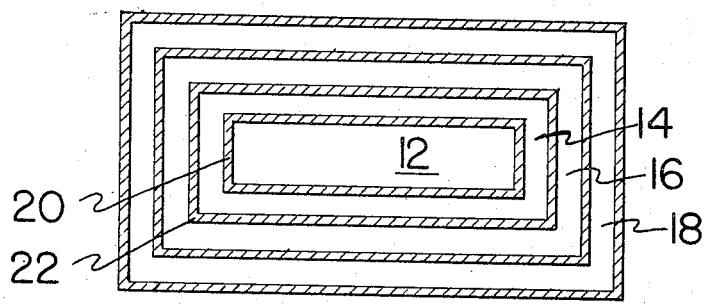
FIGURE 3 is a schematic diagrammatic cross-sectional illustration of a preferred embodiment of apparatus of the present invention comprising burner apparatus having four rectangular annuli.

In illustration of a preferred titanium dioxide producing process and apparatus therefor, referring now to FIGURE 3, fuel gas (for example, carbon monoxide) and a free-oxygen containing gas (for example, oxygen or dry air) are charged through rectangular annuli 18 and 16 respectively to a reaction zone (not shown) wherein combustion thereof is accomplished. After sufficient preheating of said reaction zone, there is charged through annulus 14 an inert gas such as nitrogen and through annulus 12, titanium tetrachloride vapors. The inert gas flowing through annulus 14 serves to shield the titanium tetrachloride vapors from direct contact with the free-oxygen containing stream emanating from annulus 16.

The materials from which the improved burners of the present invention can be fabricated are subject to considerable variation. Generally, any ceramic compositions, metal or metal alloys which are substantially inert to the temperatures, reactants and products of reaction and are capable of withstanding the thermal shock encountered are suitable. Specific examples of materials that are generally suitable for the fabrication of the burner especially when cooling of the burner is provided for are nickel, aluminum, stainless steel, glass, vitreous silica, and the like. It should be borne in mind that although ceramic materials are often satisfactory, said materials often possess relatively low resistance to thermal shock, a factor often encountered in processes involving production of pyrogenic metal oxide.

There follow a number of illustrative examples:

*Example 1*

Into a ceramic burner of the type illustrated in FIGURE 3, having approximate exterior dimensions of 30″ x 6″, wherein the hydraulic diameters (D) in inches of annuli 12, 14, 16 and 18 respectively are 0.167, 0.442, 0.586 and 0.425, there are charged 2500 s.c.f.h. dry oxygen (STP) and 3400 s.c.f.h. carbon monoxide After ignition, the resulting reaction within the reaction chamber is allowed to continue until the reaction zone has become heated to and stabilized at a temperature of about 2400–2600° F. Following establishment of thermal equilibrium the oxygen flow rate is increased to 4250 s.c.f.h. and then 2870 s.c.f.h. dry nitrogen gas, and 490 s.c.f.h. titanium tetrachloride vapor preheated to a temperature of about 800–1000° F. are then introduced through annuli 14 and 12 respectively and said titanium tetrachloride reacts with oxygen in the reaction zone to form titanium dioxide at a rate of about 100 pounds per hour. The dimensions of the annuli coupled with the flow rates utilized in this example result in laminar and plug flow conditions within the reaction chamber.

The reactions are allowed to continue for 24 hours. Said reactions are then discontinued and the inner walls of the reaction chamber and the burner are examined. No evidence of significant deposition of titanium dioxide product on either the reaction chamber walls or the burner is found.

*Example 2*

This example is a duplicate of Example 1 except that nothing is introduced through annulus 14. Thus, oxygen introduced through annulus 16 and the titanium tetrahalide vapors introduced through annulus 12 come in contact with each other substantially immediately upon exiting from the burner. After 24 hours of operation, substantial deposition of titanium dioxide is found on the reactor chamber walls and "whisker" formation is found on burner walls 20 and 22.

*Example 3*

This example is a duplicate of Example 1 except that the flow rates of the various gases are 10,200 s.c.f.h. carbon monoxide, 15,000 s.c.f.h. dry oxygen, 12,900 s.c.f.h. dry nitrogen and 1500 s.c.f.h. titanium tetrachloride. These flow rates result in highly turbulent non-laminar flow. After 24 hours of operation, it is found that a large quantity of titanium dioxide has deposited on the inner walls of the reaction chamber.

Obviously, many changes can be made in the above examples and description and in the accompanying drawing without departing from the scope of the invention. For instance, while the free-oxygen containing gas required for the combustion of the fuel gas can be charged as a mixture therewith through a single annulus, it is generally desirable that the dangers of flame flashbacks be obviated by charging the free-oxygen containing gas and the fuel gas through separate annuli.

In those cases wherein cooling of the apparatus becomes desirable it is obvious that said apparatus can be cooled by any suitable means such as by means of a water jacket.

Furthermore, although only one burner was utilized in the above examples, it is obvious that a scale-up of the process can be conveniently accomplished by utilizing a battery of said burner units disposed within a single reaction chamber.

When it is desirable that the quantity of process gases entering the burner be reduced without greatly disturbing mass flow rates, said gases can be diluted with an inert gas, such as nitrogen or helium prior to or during the charging of said gases to the burner. Thus, for example, it is possible to retain a given mass flow rate while reducing the flow of free-oxygen containing gas, metal compound vapors and/or fuel gases.

Also, although for the purposes of clarity and brevity no mention was made in the above examples or description of nucleating agents, it is well known in the metal oxide producing art that it is often desirable to "seed" a reaction zone with a nucleating agent, such as for instance, in the production of titanium dioxide, aluminum trichloride.

Accordingly, it is intended that the disclosure be regarded as illustrative and as in no way limiting the scope of the invention.

What we claim is:
1. In the process of producing pyrogenic metal oxides by reacting a metal compound in vapor form with a molecular oxygen containing gas in a reaction zone heated to a temperature of above about 1500° F., the improvement which comprises charging into the reaction zone in laminar flow the following streams:
   (a) a substantially molecular oxygen-free stream comprising a metal compound in vapor form,
   (b) a perimetrically coaxial to and surrounding said stream of metal compound, a substantially molecular oxygen-free annular stream comprising a fuel gas, and
   (c) perimetrically coaxial to and surrounding said stream of fuel gas, an annular gas stream comprising at least sufficient molecular oxygen to react stoichiometrically with said fuel gas and with said metal compound, the adjacent streams having linear velocities within about 15% of one another, thereby producing metal oxide product without substantial deposition of said product on burner and reaction zone enclosure apparatus.

2. The process of claim 1 wherein said metal compound is a metal oxyhalide.

3. The process of claim 1 wherein said metal compound is a metal halide.

4. The process of claim 1 wherein said metal compound is titanium tetrachloride.

5. The process of claim 1 wherein said free-oxygen containing gas is air.

6. The process of claim 1 wherein said free-oxygen containing gas is oxygen.

7. The process of claim 1 wherein said fuel gas is carbon monoxide.

8. The process of claim 1 wherein said metal compound is titanium tetrachloride, said free-oxygen containing gas is air and said fuel gas is carbon monoxide.

9. The process of claim 1 wherein each of said streams charged to the reaction zone in laminar flow have a rectangular configuration and are annular.

10. The process of claim 1 wherein said metal compound stream is annular.

11. In the process of producing pyrogenic metal oxides by reacting a metal compound in vapor form with a molecular oxygen containing gas in a reaction zone heated to a temperature above about 1500° F., the improvement which comprises charging into the reaction zone in laminar flow the following streams:
   (a) a substantially molecular oxygen-free stream comprising a metal compound in vapor form,
   (b) perimetrically coaxial to and surrounding said stream of metal compound, a substantially molecular oxygen-free annular stream of inert gas, and
   (c) perimetrically coaxial to and surrounding said stream of inert gas, in any order, an annular stream of fuel gas and an annular gas stream comprising at least sufficient molecular oxygen to react stoichiometrically with said fuel gas and said metal compound, the adjacent streams having linear velocities within about 15% of one another, thereby producing metal oxide product without substantial deposition of said product on burner and reaction zone enclosure apparatus.

12. The process of claim 11 wherein said titanium compound is titanium tetrachloride.

13. The process of claim 11 wherein said inert gas stream comprises nitrogen.

14. The process of claim 11 wherein said free-oxygen containing gas is oxygen.

15. The process of claim 11 wherein said metal compound is titanium tetrachloride, said free-oxygen containing gas is air, said inert gas is nitrogen and said fuel gas is carbon monoxide.

16. The process of claim 11 wherein said metal compound stream is also annular.

17. The process of claim 11 wherein all of said streams charged to the reaction zone have a rectangular configuration and are annular.

References Cited

UNITED STATES PATENTS

| | | | |
|---|---|---|---|
| 2,240,343 | 4/1941 | Muskat | 23—202 |
| 2,394,633 | 2/1946 | Pechukas et al. | 23—202 |
| 2,635,946 | 4/1953 | Weber et al. | |
| 2,750,260 | 6/1956 | Nelson et al. | 23—202 |
| 2,779,662 | 1/1957 | Frey | 23—202 |
| 2,957,753 | 10/1960 | Nelson et al. | 23—202 |
| 2,980,509 | 4/1961 | Frey | 23—202 |
| 3,069,282 | 12/1962 | Allen | 23—202 X |
| 3,203,762 | 8/1965 | Carpenter | 23—202 |

MILTON WEISSMAN, *Primary Examiner.*

EDWARD STERN, OSCAR R. VERTIZ,
*Assistant Examiners.*